United States Patent
Kingdon et al.

[19]

[11] Patent Number: 6,047,183
[45] Date of Patent: Apr. 4, 2000

[54] SELECTION OF POSITIONING HANDOVER CANDIDATES BASED ON ANGLE

[75] Inventors: Christopher H. Kingdon, Garland; Bagher R. Zadeh, Dallas, both of Tex.

[73] Assignee: Ericsson Inc., Reseach Triangle Park, N.C.

[21] Appl. No.: 08/960,720

[22] Filed: Oct. 30, 1997

[51] Int. Cl.[7] .............................. H04Q 7/20; H04B 7/26
[52] U.S. Cl. .................. 455/440; 455/456; 455/438; 455/525; 342/450
[58] Field of Search ...................... 455/440, 525, 455/456, 436, 437, 438, 439; 342/450, 359

[56] References Cited

U.S. PATENT DOCUMENTS

| | | | |
|---|---|---|---|
| 5,043,736 | 8/1991 | Darnell et al. | 342/357 |
| 5,235,633 | 8/1993 | Dennison et al. | 379/60 |
| 5,327,144 | 7/1994 | Stilp et al. | 342/387 |
| 5,327,575 | 7/1994 | Menich et al. | 455/437 |
| 5,365,516 | 11/1994 | Jandrell | 370/18 |
| 5,379,447 | 1/1995 | Bonta et al. | 455/437 |
| 5,394,158 | 2/1995 | Chia | 342/457 |
| 5,432,843 | 7/1995 | Bonta | 455/438 |
| 5,568,153 | 10/1996 | Béliveau | 342/357 |
| 5,613,205 | 3/1997 | Dufour | 455/440 |
| 5,640,676 | 6/1997 | Garncarz et al. | 455/33.2 |
| 5,657,487 | 8/1997 | Doner | 455/456 |
| 5,732,354 | 3/1998 | MacDonald | 455/456 |
| 5,930,713 | 7/1999 | Nguyen | 455/440 |

FOREIGN PATENT DOCUMENTS

| | | |
|---|---|---|
| WO 92/05672 | 4/1992 | WIPO. |
| WO 97/27711 | 7/1997 | WIPO. |

OTHER PUBLICATIONS

PCT International Search Report dated Feb. 12, 1999.

*Primary Examiner*—Dwayne D. Bost
*Assistant Examiner*—Erika A. Gary
*Attorney, Agent, or Firm*—Jenkens & Gilchrist, P.C.

[57] ABSTRACT

A telecommunications system and method for determining optimal target Base Transceiver Stations (BTSs) to perform positioning handovers and obtain positioning data is disclose. When a positioning request is received by a Base Station Controller (BSC) serving the Mobile Station (MS) to be positioned, the serving BSC accesses a database within the BSC, which contains a list of cells belonging to candidate target BTSs. Based on this information, and the main antenna direction of the serving BTS, two candidates for positioning handovers are selected from the list such that the angle between the main direction of two adjacent BTSs is nearly equivalent to the angle between the main direction of two additional adjacent BTSs. By selecting the target BTSs in this manner, it can be ensured that the target BTSs surround the MS, thus decreasing the error in the location calculations performed by a Positioning Center (PC).

15 Claims, 5 Drawing Sheets

SELECTION OF POSITIONING HANDOVER CANDIDATES BASED ON ANGLE

BACKGROUND OF THE PRESENT INVENTION

1. Field of the Invention

The present invention relates generally to telecommunications systems and methods for determining the location of a mobile terminal within a cellular network, and specifically to determining the optimal target Base Transceiver Stations to perform positioning handovers and obtain positioning data.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

Currently, as can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Positioning Center (PC) 270 for calculation of the geographical location of the MS 200. The location of the MS 200 can then be sent to the application 280 that requested the positioning. Alternatively, the requesting application 280 could be located within the MS 200 itself.

In order to accurately determine the location of the MS 200, positioning data from three separate Base Transceiver Stations (210, 220, and 230) is required. This positioning data for GSM systems includes a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle can be used, instead of the TA value of GSM systems.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.c., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.c., 320 milliseconds.

If there are more than three BTSs (210, 220, and 230) within the range of the MS 200, the serving BSC 240 will have to determine which two BTSs 210 and 230 will perform a positioning handover (in order to obtain the TA values). In addition, if the serving BTS 220 does not support positioning, three target BTSs must be selected. At present, this selection process is typically performed by the BSC 240 compiling a mobile assisted handover list based on measurements obtained by the MS 200 regarding the signal strength of the surrounding BTSs (210, 220 and 230). The BSC 240 then selects the two or three BTSs (220 and 230) with the strongest signal strength to perform a positioning handover.

Unfortunately, the selected BTSs (210, 220, and 230) may not be the ideal candidates for obtaining positioning data. For example, if the BTSs (210, 220, and 230) selected for positioning handovers do not surround the mobile station 200 to be positioned, the error in the location calculation will increase.

It is therefore an object of the invention to determine the optimal target Base Transceiver Stations to perform positioning handovers and obtain positioning data, in order to accurately determine the location of a mobile terminal within a cellular network.

SUMMARY OF THE INVENTION

The present invention is directed to telecommunications systems and methods for determining the optimal target Base Transceiver Stations to perform positioning handovers and obtain positioning data. When a positioning request is received by the Base Station Controller (BSC) serving the Mobile Station (MS) to be positioned, the serving BSC accesses a database within the BSC, which contains a list of candidate target BTSs. For example, the list could include the cells that have the strongest signal strengths, as measured by the MS. Based on this information, and the main antenna direction of the serving cell, two candidate cells for positioning handovers are selected from the list such that the angle between the main direction of two adjacent cells is as close to equivalent to the angle between the main direction of two additional adjacent cells, as possible. By selecting the target BTSs in this manner, and not based on signal strength alone, it can be ensured that the target BTSs are spread out as much as possible, and that the target BTSs actually surround the MS, thus decreasing the error in the location calculations performed by the positioning center.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
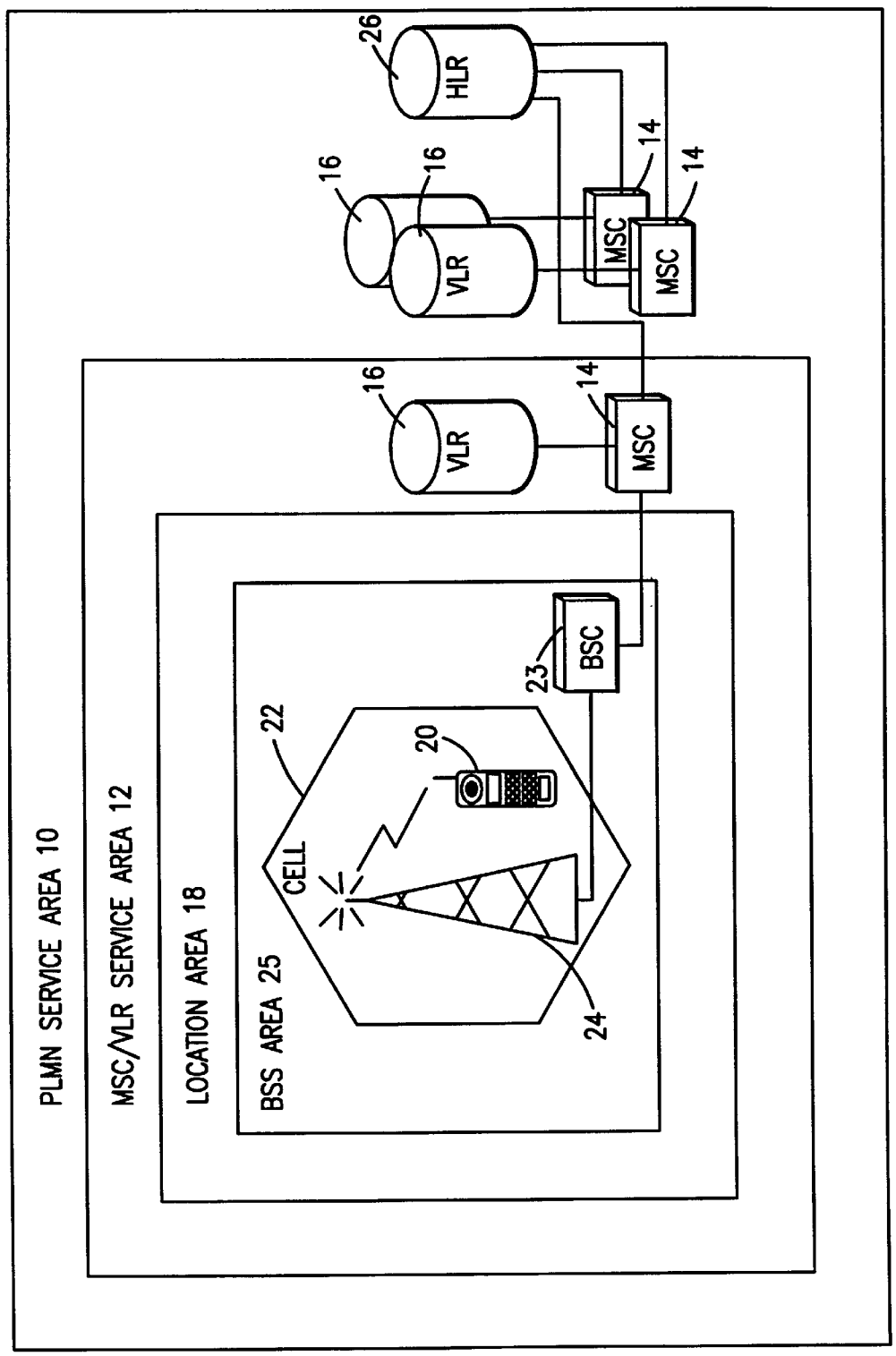
FIG. 1 is a block diagram of a conventional terrestrially-based wireless telecommunications system.
Figure 2:
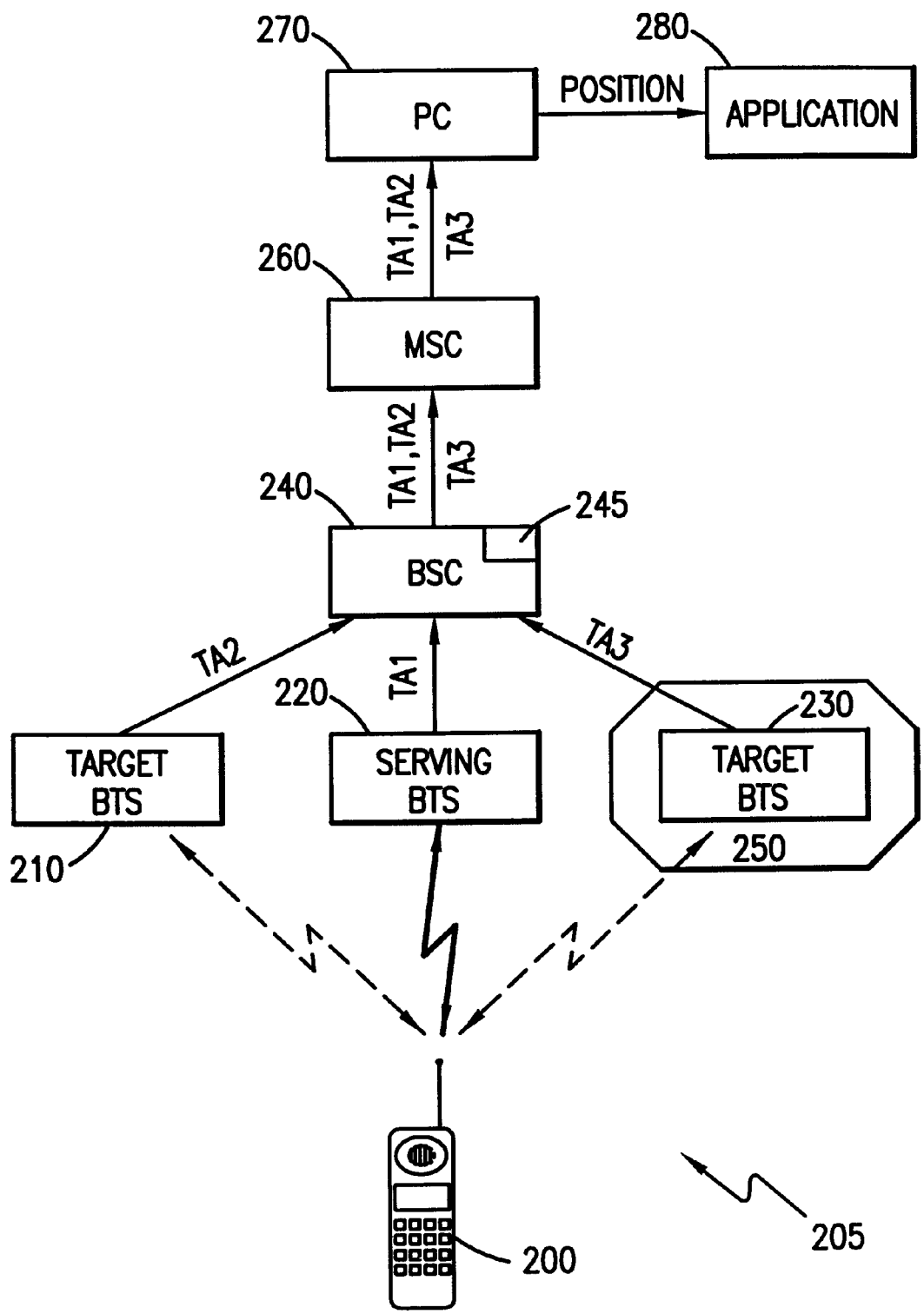
FIG. 2 illustrates a sample positioning handover in which positioning data is acquired by a target base transceiver station and transmitted to a serving base station controller.
Figure 3A:
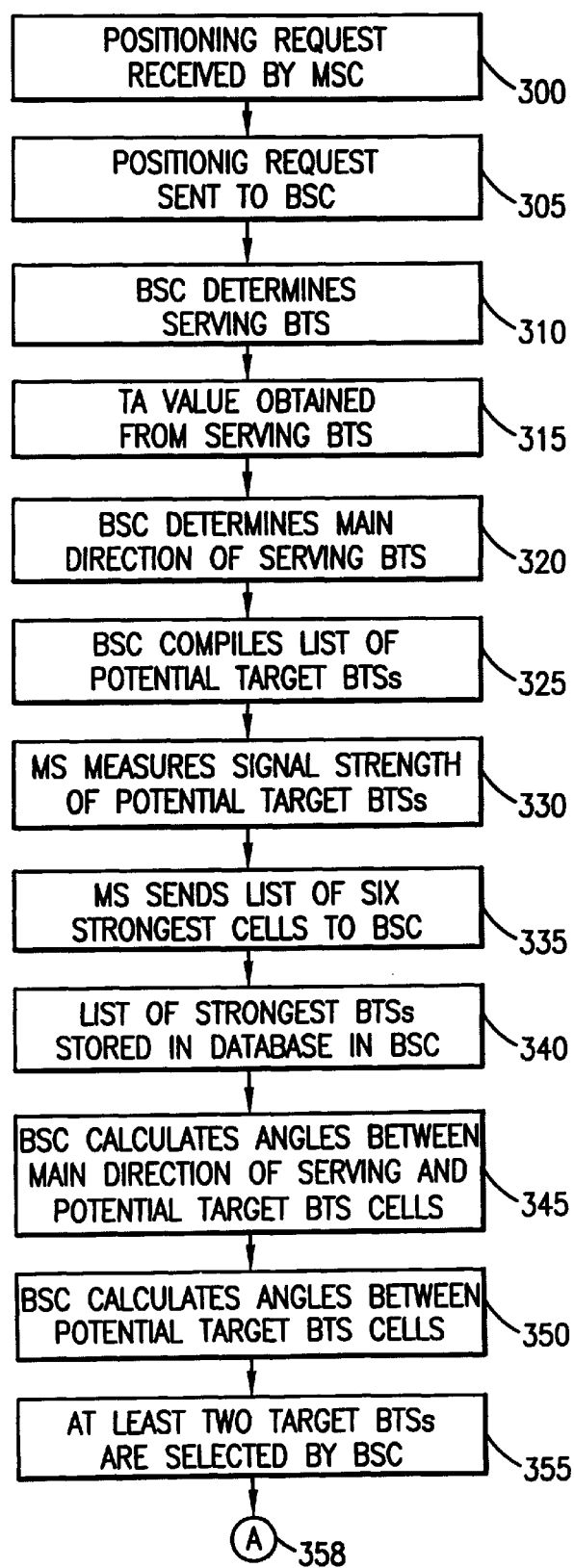
FIGS. 3A and 3B are flow charts demonstrating steps in a sample embodiment of the optimum target base transceiver station determination for positioning handovers process of the present invention.
Figure 3B:
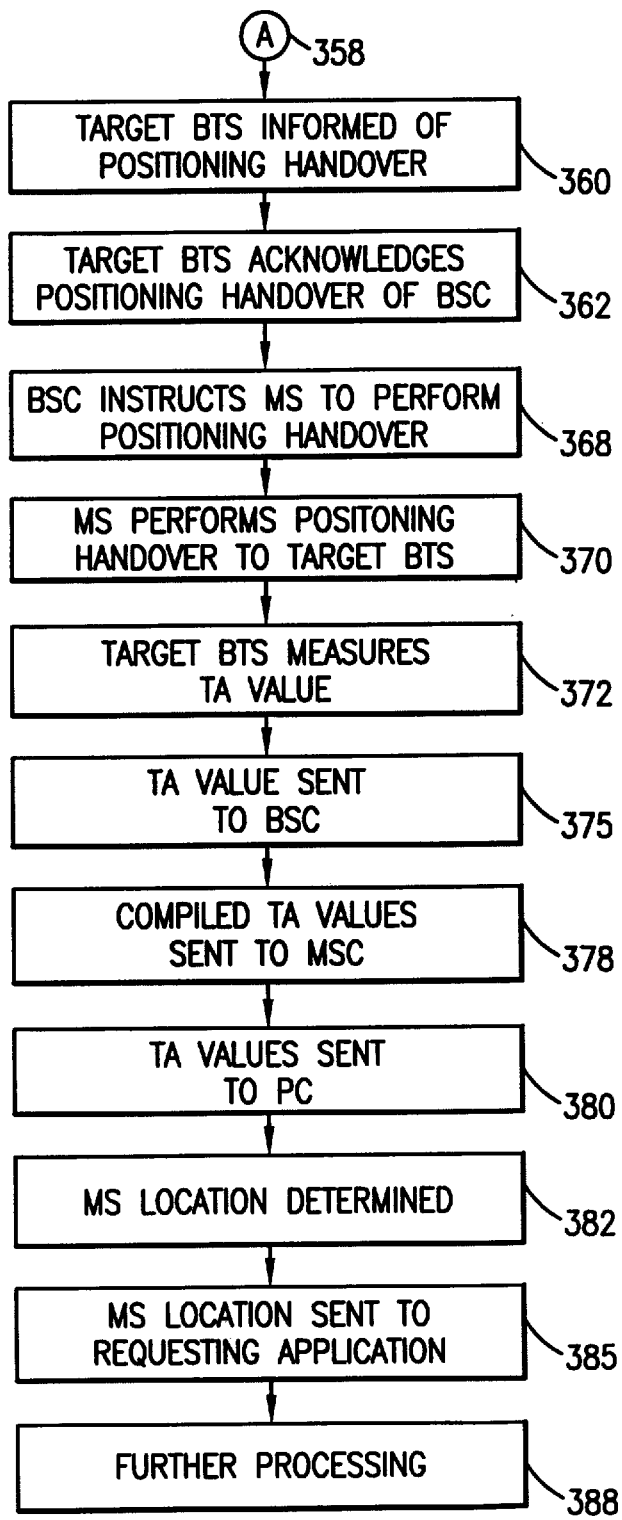

With reference now to FIGS. 2, 3A and 3B of the drawings, steps in a sample process for determining the optimal base transceiver stations in order to locate a Mobile Station 200 within a cellular network 10 are illustrated. Initially, after a positioning request is received by a Mobile Switching Center 260 (step 300) serving a Location Area 205 containing the MS 200 from a Positioning Center 270, which could be located within the MSC 260, or could be a separate node in communication with the MSC 260, the MSC 260 sends this positioning request to an originating (serving) Base Station Controller (BSC) 240 (step 305) if the Mobile Station 200 is in a dedicated mode (in use). However, if the MS 200 is in an idle mode (not in use), the MSC 260 must page the MS 200 and setup a call to the MS before forwarding the positioning request to the BSC. This call does not activate the ringing tone on the MS 200, and therefore, is not noticed by the MS 200.

The originating BSC 240 then determines which Base Transceiver Station (BTS) 220 is currently serving the MS 200 (step 310), and obtains a Timing Advance (TA) value (TA1), or other positioning data, from this serving BTS 220 (step 315), if possible. Thereafter, TA values are obtained from two target BTSs (210 and 230) (step 370) by performing a positioning handover (step 368). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

Figure 4:
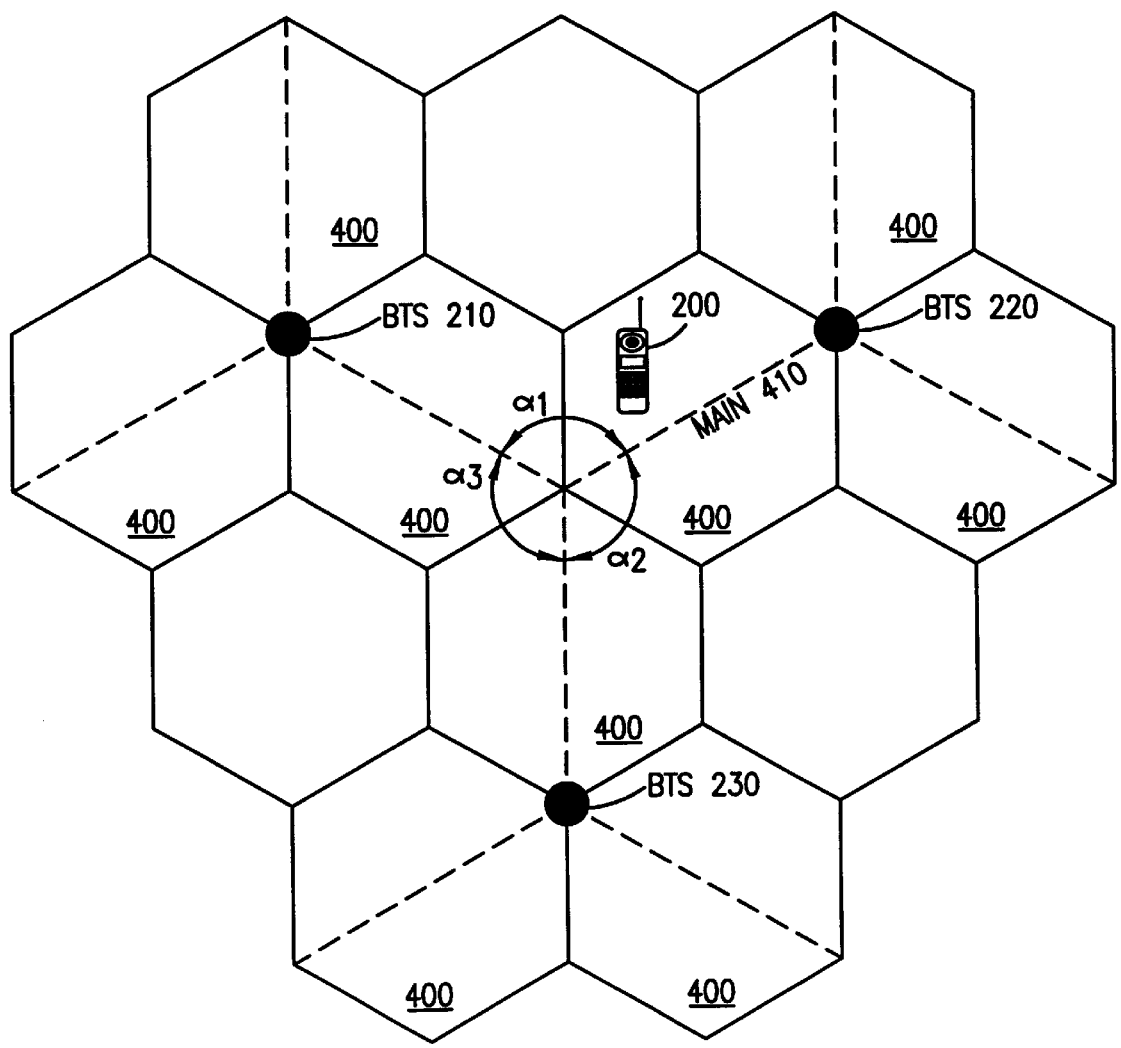
FIG. 4 shows the relative angles between the serving base transceiver station and surrounding base transceiver stations for the determination of optimum target base transceiver stations.

With reference now to FIG. 4 of the drawings, which will be discussed in connection with FIGS. 2, 3A, and 3B, in order to determine the optimal target BTSs (210 and 230), the serving BSC 240 determines the main direction 410 of the serving BTS 220 (step 320), e.g., degrees as seen on a compass, (0–359 degrees), where 0 degrees is north, and 180 degrees is south. Each BTS (210, 220, and 230) may serve multiple cells 400 (sectors), e.g., three sectors/cells 400 per BTS (210, 220, or 230), or the BTS (210, 220, or 230) may be an omniantenna, serving only one sector/cell 400. The main direction 410 of the serving BTS 220 is the direction of the signal into the cell 400 containing the MS 200.

The BSC 240 then compiles a list of cells (210 and 230) (step 325) and instructs the MS 200 to measure the signal strength in each cell 400 (step 330). Thereafter, the MS 200 sends a list of the six cell identities 400 with the strongest signal strengths to the BSC 240 (step 335), which then determines the potential target BTSs (210 and 230) associated with these cell identities 400, and stores them in a database 245 (step 340). The number of potential target BTSs (210 and 230) varies depending upon the number of cells 400 that each BTS (210 and 230) serves and the location of the six strongest cells 400. This database 245 of potential target BTSs (210 and 230) can also be obtained through other means. For example, the serving BSC 240 can select all BTSs (210 and 230) within a predefined radius around the serving BTS 220.

The serving BSC 240 then accesses this database 245, which contains all of the BTSs (210 and 230) that either the MS 200 has measured, or are within a predefined radius around the serving BTS 220, and selects from this list at least two target BTSs (210 and 230) to perform a positioning handover (step 355). As indicated in FIG. 4, this selection process begins by the BSC 240 calculating the angles ($\alpha_1$ and $\alpha_2$) between the main direction 410 of the serving BTS 220 and each direction of each potential target BTS (210 and 230) (step 345) and the angles $\alpha_3$ between each direction of each potential target BTS (210 and 230) (step 350). Two candidate BTSs (210 and 230) for triangulation, apart from the serving BTS 220, if it supports positioning, are then selected from the list stored in the database 245 (step 355) such that they fulfill the expression:

$$\text{minimize } \{\text{sum for } j=1 \text{ to } j=N \text{ of } |(360/N)-\alpha_j|\};$$

where N is the number of candidate target BTSs (210 and 230), and $\alpha_j$ are the angles between the main direction 410 of the serving BTS 220 and each direction of, for example, the first candidate BTS 210 (j=1) (only $\alpha_1$ is shown), the main direction 410 of the serving BTS 220 and each direction of, for example, the second candidate BTS 230 (j=2) (only $\alpha_2$ is shown) and between each direction of, for example, the first (j=1) candidate BTS 210 and the second (j=2) candidate BTS 230 (only $\alpha_3$ is shown). The expression is fulfilled when the angles ($\alpha_1$, $\alpha_2$, and $\alpha_3$) between selected target BTSs (210 and 230) and the serving BTS 220 are nearly equivalent, e.g. the lowest sum obtainable from the candidate list, in order to allow the Positioning Center (PC) 270 to accurately perform the triangulation algorithm and restrict the location calculation error to the smallest possible radius. The number of target BTSs (210 and 230) can vary depending upon the positioning method used. By selecting the candidates in this manner, it can be ensured that the target BTSs (210 and 230) are spread out as much as possible, and actually surround the MS 200, in order to accurately determine the location of the MS 200.

The positioning handover to one of the optimal target BTSs 230 (step 358) is accomplished by the serving BSC 240 sending a new ACTIVATION TYPE in a CHANNEL ACTIVATION message to the target BTS 230, which informs the target BTS 230 that a positioning handover needs to be performed (step 360). The target BTS 230 then acknowledges the CHANNEL ACTIVATION message to the serving BSC 250 (step 362).

Thereafter, the BSC 240 sends a command to the MS 200 via the serving BTS 220 (step 368) to transmit a HANDOVER ACCESS message to the target BTS 230 (step 370). During the time that the MS 200 is waiting for a response from the target BTS 230, e.g., around 320 milliseconds, the target BTS 230 measures the Timing Advance value (access delay) (TA3) (step 372), using access bursts sent by the MS 200, and forwards this positioning data to the serving BSC 240 (step 375). A positioning handover can then be performed to the other target BTS 210 in the same manner as stated hereinbefore. The TA value measured by the target BTS 230 (TA3) is then transmitted by the serving BSC 250 to the MSC 260 (step 378), together with TA values (TA1 and TA2) obtained from the serving BTS 220 and other target BTSs 210.

Finally, the TA value acquired from the target BTS 230 (TA3), together with other TA values (TA1 and TA2) are forwarded to the Positioning Center (PC) 270 from the MSC 260 (step 380), where the location of the MS 200 is determined using the triangulation algorithm (step 382). The PC 270 then presents the geographical position of the MS 200 to the requesting application (node) 280 (step 385) for further processing (step 388).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the aforedescribed determination of optimal target Base Transceiver Stations can be implemented in any cellular system, and should not be limited to GSM systems. In other cellular systems, the Base Station Controller function (controlling node) can be implemented within the Mobile Switching Center itself.

What is claimed is:

1. A telecommunications system for determining first and second optimal target base transceiver stations to be utilized for triangulation to determine the location of a mobile terminal, said telecommunications system comprising:

a serving base transceiver station in wireless communication with said mobile terminal, said serving base transceiver station having a main antenna direction associated therewith; and a controlling node connected to said serving base transceiver station, said controlling node being adapted to select said first and second optimal target base transceiver stations from a candidate list of potential target base transceiver stations based on the calculation of first angles between an antenna direction of each of said potential target base transceiver stations and said main direction and second angles between each said respective antenna direction of each of said potential target base transceiver stations;

wherein said first and second optimal target base transceiver stations have the minimum difference between said respective first angles and between each of said respective first angles and said respective second angle associated with said first and second optimal target base transceiver stations.

2. The telecommunications system of claim 1, wherein said controlling node is a base station controller.

3. The telecommunications system of claim 1, wherein said controlling node is within a mobile switching center.

4. The telecommunications system of claim 1, further comprising a database within said controlling node containing a list of cells and said associated potential target base transceiver stations.

5. The telecommunications system of claim 1, wherein positioning handovers are performed to said first and second optimal target base transceiver stations for triangulation to determine the location of said mobile terminal, said positioning handovers being performed by said mobile terminal sending respective messages to said first and second optimal target base transceiver stations instructing said first and second optimal base transceiver stations to obtain positioning data.

6. The telecommunications system of claim 5, wherein said positioning data are Timing Advance values.

7. The telecommunications system of claim 5, wherein the location of said mobile terminal is determined by a positioning center in communication with said controlling node, said positioning center using said positioning data to determine the location of said mobile terminal.

8. The telecommunications system of claim 7, wherein the location of said mobile terminal is sent from said positioning center to a requesting node in communication with said positioning center.

9. A method for determining first and second optimal target base transceiver stations to be utilized for triangulation to determine the location of a mobile terminal, said mobile terminal being in wireless communication with a serving base transceiver station having a main antenna direction associated therewith, said method comprising the steps of:

determining a candidate list of potential target base transceiver stations by a controlling node connected to said serving base transceiver station;

calculating first angles between an antenna direction of each of said potential target base transceiver stations and said main antenna direction;

calculating second angles between each said respective antenna direction of each of said potential target base transceiver stations;

selecting said first and second optimal target base transceiver stations having the minimum difference between said respective first angles and between each of said respective first angles and said respective second angle associated with said first and second optimal target base transceiver stations.

10. The method of claim 9, wherein said controlling node is a base station controller.

11. The method of claim 9, wherein said step of determining is performed by said mobile terminal measuring the signal strength associated with a plurality of cells associated with said potential target base transceiver stations and forwarding the signal strength of each of said cells to said controlling node.

12. The method of claim 9, further comprising, after said step of selecting, the step of:

performing positioning handovers to said first and second optimal target base transceiver stations for triangulation to determine the location of said mobile terminal, said step of performing said positioning handovers being performed by said mobile terminal sending respective messages to said first and second optimal target base transceiver stations instructing said first and second optimal base transceiver stations to obtain positioning data.

13. The method claim 12, wherein said positioning data are Timing Advance values.

14. The method of claim 12, further comprising, after said step of performing said positioning handovers, the step of:

determining, by a positioning center in communication with said controlling node, the location of said mobile terminal, using said positioning data.

15. The method of claim 14, further comprising, after said step of determining the location of said mobile terminal, the step of:

sending the location of said mobile terminal from said positioning center to a requesting node in communication with said positioning center.

* * * * *